United States Patent
Jenkins et al.

(10) Patent No.: US 7,031,793 B1
(45) Date of Patent: Apr. 18, 2006

(54) CONFLICT RESOLUTION AMONG MULTIPLE CONTROLLERS

(75) Inventors: Naomi M. Jenkins, Round Rock, TX (US); Jin Wang, Austin, TX (US); Richard J. Markle, Austin, TX (US); Elfido Coss, Jr., Austin, TX (US); Brian K. Cusson, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 48 days.

(21) Appl. No.: 10/286,305

(22) Filed: Nov. 1, 2002

(51) Int. Cl.
*G06F 19/00* (2006.01)
*G05B 11/01* (2006.01)
*G05B 19/18* (2006.01)
*G05B 15/02* (2006.01)

(52) U.S. Cl. .............................. 700/121; 700/9; 700/20

(58) Field of Classification Search .................... 700/2, 700/3, 9, 10, 90, 95, 96, 121, 19, 20
See application file for complete search history.

(56) References Cited

U.S. PATENT DOCUMENTS

| | | | |
|---|---|---|---|
| 6,197,604 B1 * | 3/2001 | Miller et al. | 438/14 |
| 6,282,457 B1 * | 8/2001 | Miura et al. | 700/121 |
| 6,304,791 B1 * | 10/2001 | Kim | 700/121 |
| 2002/0151987 A1 * | 10/2002 | Mendez | 700/8 |

* cited by examiner

*Primary Examiner*—Leo Picard
*Assistant Examiner*—Ryan A. Jarrett
(74) *Attorney, Agent, or Firm*—William Morgan & Amerson, LLP

(57) ABSTRACT

A method and an apparatus are provided for conflict resolution among a plurality of controllers. The method includes receiving a first control instruction from a first process controller to process a workpiece, receiving a second control instruction from a second process controller to process the workpiece and adjusting at least one of the first control instruction and the second control instruction to process the workpiece to achieve a desired process goal.

24 Claims, 2 Drawing Sheets

CONFLICT RESOLUTION AMONG MULTIPLE CONTROLLERS

BACKGROUND OF THE INVENTION

1. Field of the Invention

This invention relates generally to a semiconductor fabrication process, and, more particularly, to resolving conflicts among multiple controllers in the semiconductor fabrication process.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a group of wafers, sometimes referred to as a "lot," using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial improvements.

One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface which facilitates communications between the manufacturing tool and the manufacturing framework. The machine interface can generally be part of an Advanced Process Control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process, various events may take place that affect the performance of the devices being fabricated. That is, variations in the fabrication process steps result in device performance variations. Factors, such as feature critical dimensions, doping levels, particle contamination, film optical properties, film thickness, film uniformity, etc., all may potentially affect the end performance of the device. Various tools in the processing line are controlled in accordance with performance models to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology data to attempt to achieve post-processing results as close to a target value as possible. Reducing variation in this manner leads to increased throughput, reduced cost, higher device performance, etc., all of which equate to increased profitability.

Tools in the processing line may be controlled by a plurality of controllers that have little or no communication among themselves. As such, even though the plurality of controllers may be attempting to achieve a common processing goal, in some cases, because of lack of communication among the controllers, the controllers may issue inconsistent or conflicting control instructions to the tool. Issuing inconsistent and/or conflicting control instructions can introduce inefficiencies in the manufacturing process.

The present invention is directed to overcoming, or at least reducing the effects of, one or more of the problems set forth above.

SUMMARY OF THE INVENTION

In one embodiment of the present invention, a method is provided for conflict resolution among a plurality of controllers. The method includes receiving a first control instruction from a first process controller to process a workpiece, receiving a second control instruction from a second process controller to process the workpiece and adjusting at least one of the first control instruction and the second control instruction to process the workpiece to achieve a desired process goal.

In another embodiment of the present invention, an apparatus is provided for conflict resolution among a plurality of controllers. The apparatus includes an interface communicatively coupled to a control unit. The interface is adapted to receive a first control instruction from a first process controller and a second control instruction from a second process controller. The control unit adapted to adjust at least one of the first control instruction and the second control instruction to process one or more workpieces to achieve a desired process goal.

In a further embodiment of the present invention, an article comprising one or more machine-readable storage media containing instructions is provided for conflict resolution among a plurality of controllers. The one or more instructions, when executed, enable the processor to receive a first control instruction from a first controller to process one or more workpieces, receive a second control instruction from a second controller to process the one or more workpieces and receive a desired process goal. The one or more instructions, when executed, further enable the processor to adjust at least one of the first control instruction and the second control instruction to process the one or more workpieces to achieve the desired process goal.

In a further embodiment of the present invention, a system is provided for conflict resolution among a plurality of controllers. The system comprises a first process controller, a second process controller and a supervisory controller. The first process controller is adapted to provide a first control instruction to process one or more workpieces. The second process controller is adapted to provide a second control instruction to process the one or more workpieces. The supervisory controller is adapted to adjust at least one of the first control instruction and the second control instruction to process the one or more workpieces to achieve a desired process goal.

BRIEF DESCRIPTION OF THE DRAWINGS

The invention may be understood by reference to the following description taken in conjunction with the accompanying drawings, in which like reference numerals identify like elements, and in which.

Figure 1:
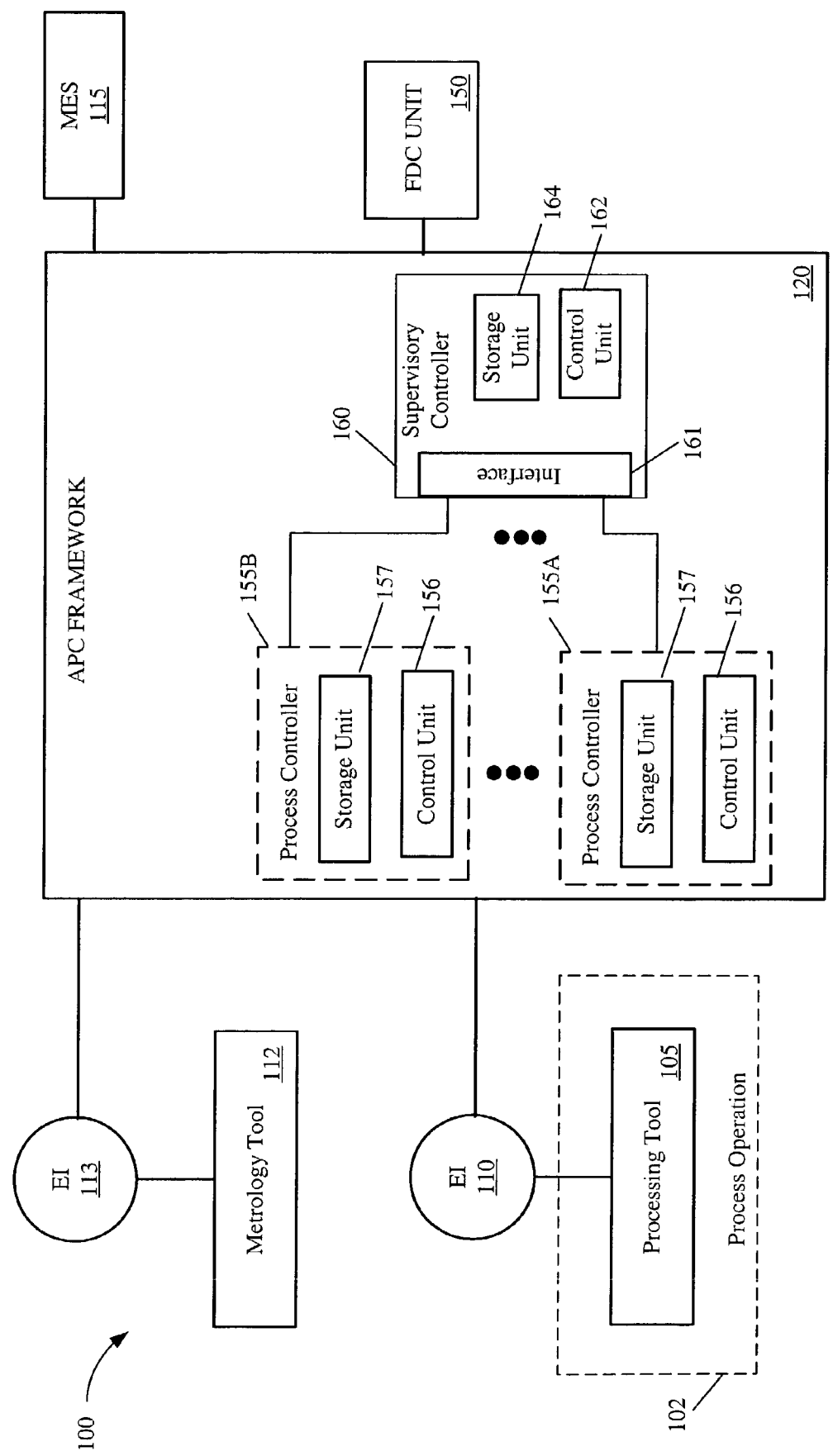
FIG. 1 illustrates a processing system, including an APC framework, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As is described in greater detail below, one or more embodiments of the present invention are directed to resolving conflicts between multiple process controllers that control a process or a processing tool.

Turning now to the drawings, and specifically referring to FIG. 1, a block diagram of a system 100 is illustrated, in accordance with one embodiment of the present invention. The system 100, in the illustrated embodiment, includes at least one process operation 102 for implementing an industrial process, such as a semiconductor fabrication process, a photographic process, a chemical process, or any other process in which a plurality of variables, such as temperature, tool parameters, pressure level and chemical compositions, and the like may be monitored and analyzed. The variables may be monitored and analyzed, for example, to detect faults and/or classify the detected faults.

In the system 100, the process operation 102 may be performed using one or more processing tools 105. For ease of illustration, only one processing tool 105 is shown in FIG. 1. Generally, the particular type of process operation 102 that is performed, and the type of processing tool(s) 105 employed in that process operation 102, depends on the particular implementation. For example, in the context of a chemical industrial process, the process operation 102 may include processing a polymer. In the context of a photographic process, the process operation 102 may, for example, include processing a film.

For illustrative purposes, the process operation 102 depicted in FIG. 1 is at least a portion of a semiconductor fabrication process, which, for example, may be part of an overall semiconductor process flow. The processing tool 105, in the illustrated embodiment, may take the form of any semiconductor fabrication equipment used to produce a processed workpiece, such as a silicon wafer. The semiconductor process may be utilized to produce a variety of integrated circuit products including, but not limited to, microprocessors, memory devices, digital signal processors, application specific integrated circuits (ASICs), or other similar devices. An exemplary processing tool 105 may include an exposure tool, an etch tool, a deposition tool, a polishing tool, a rapid thermal anneal processing tool, a test-equipment tool, an ion implant tool, a packaging tool and the like.

In the system 100 of FIG. 1, the processing tool 105 has an associated equipment interface 110, and a metrology tool 112 has an associated equipment interface 113, for interfacing with an Advanced Process Control (APC) framework 120. In the illustrated embodiment, the metrology tool 112 measures aspects of the workpieces (e.g., wafers) that are processed in the process operation 102. The metrology tool 112, in one embodiment, may be capable of measuring aspects of the workpieces off-line, in-line, in-situ or a combination thereof.

The manufacturing system 100 may include a manufacturing execution system (MES) 115 that is coupled to the APC frame work 120. The manufacturing execution system 115 may, for example, determine the processes that are to be performed by the processing tool 105, when these processes are to be performed, how these processes are to be performed, etc. In the illustrated embodiment, the manufacturing execution system 115 manages and controls the overall system through the APC framework 120.

An exemplary APC framework 120 that may be suitable for use in the manufacturing system 100 may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based on the Advanced Process Control (APC) Framework. CIM (SEMI E81-0699-Provisional Specification for CIM Framework Domain Architecture) and APC (SEMI E93-0999-Provisional Specification for CIM Framework Advanced Process Control Component) specifications are publicly available from SEMI, which is headquartered in Mountain View, Calif.

In one embodiment, a fault detection and classification (FDC) unit 150 may be coupled to the APC framework 120. The FDC unit 150 detects occurrences of faults associated with the process operation 102.

The APC framework 120 includes a plurality of process controllers 155A, 155B that, through a feedback (or feed forward) process, aid one or more processing tools 105 to perform desired process(s) to thereby achieve the desired result(s). For ease of illustration, two process controllers 155A, 155B are shown in FIG. 1, although in other embodiments, more than two process controllers 155 may be employed. Each process controller 155 in the illustrated embodiment includes a control unit 156 and a storage unit 157. The process controllers 155A, 155B are independent controllers that have little or no communication with each other. The process controllers 155 may be run-to-run controllers, in one embodiment.

For the purposes of this description, the two process controllers 155A, 155B are sometimes referred to as the "first process controller 155A" and the "second process controller 155B." It should be appreciated that such references are intended to cover any combination of at least two process controllers that control the processing tool(s) 105, and such references are not intended to be limited to the absolute "first" and "second" process controllers 155 that control the processing tool(s) 105. As noted earlier, in some embodiments, the processing tool(s) 105 may be controlled by more than two process controllers 155.

The process controllers 155A, 155B, in one embodiment, may each control various aspects of the same processing tool 105. As an example, both processing controllers 55A, 155B may control a polishing tool, where the first process controller 155A calculates the downforce desired to polish a wafer, and the second process controller 155B calculates the polishing time desired to achieve the desired process goal. A third process controller (not shown) may be used to calculate the desired rotational speed for the wafer head during the polishing process. As another example, the processing controllers 155A, 155B may control an etching tool, where the first process controller 155A controls the gas flow rate to a chamber of the etching tool and the second process controller 155B adjusts the pressure in that chamber. An additional process controller (not shown) may be utilized to control the temperature in the chamber of the etching tool.

In an alternative embodiment, each of the process controllers 155 may control its respective processing tool 105. For example, the first process controller 155A may control a deposition tool, and the second process controller 155B may control an etching tool that processes wafers after they have been processed by the deposition tool. Similarly, the process controllers 155 may each control various other types of processing tools 105, depending on the particular implementation.

Generally, each process controller 155A, 155B receives process data, such as metrology data, to adjust selected parameters of the processing tool 105 under the control of that process controller 155A, 155B to reduce variations in the characteristics of the workpieces that are processed. As indicated earlier, in one embodiment, both of the process controllers 155A, 155B may control various aspects of the same processing tool 105 or each process controller 155A, 155B may control its own processing tool 105. For ease of illustration, it is herein assumed that both of the process controllers 155 control various aspects or parameters of the same processing tool 105. The particular control actions taken by the process controllers 155 depend on the particular processes performed by the processing tool 105, and the output characteristic measured by the metrology data.

The process controllers 155 may use one or more control models (not shown) to generate a control action for the processing tool 105, where the control models can be developed empirically using commonly known linear or non-linear techniques. A control model may be a relatively simple equation-based model (e.g., linear, exponential, weighted average, etc.) or a more complex model, such as a neural network model, principal component analysis (PCA) model, partial least squares projection to latent structures (PLS) model. The specific implementation of a control model may vary depending on the modeling techniques selected and the process being controlled.

As noted earlier, the process controllers 155A, 155B may be independent controllers that have little or no communication with each other. As such, even though the process controllers 155A, 155B may attempt to achieve a common processing goal, in some cases, the process controllers 155A, 155B issue inconsistent or conflicting control instructions to the processing tool(s) 105. Examples of process controllers 155A, 155B providing inconsistent or conflicting control instructions to the processing tool(s) are described below.

As an example, assume that an etching tool is controlled by the first and second process controllers 155A, 155B, where the first process controller 155A controls the gas flow to a chamber of the etching tool and the second process controller 155B controls the pressure level within the chamber of the etching tool. If the etching tool experiences a problem (e.g., clogging) with one of its gas inlets, the first process controller 155A may attempt to compensate for this shortcoming by increasing the gas flow to the chamber. The increased gas flow may increase the pressure inside the chamber, thereby causing the second process controller 155B to adjust the pressure level. Thus, in the above-described example, even though the two process controllers 155A, 155B are attempting to achieve a common goal (e.g., to etch to a desired depth, etch rate, etc.,), the two process controllers 155A, 155B provide competing (or inconsistent) control instructions to the etching tool, with one process controller 155A calling for an increase in the gas flow and the other process controller 155B for a decrease in the pressure level.

As another example, assume that both of the process controllers 155A, 155B control selected parameters of a polishing tool. In particular, the first process controller 155A determines the downforce desired to polish a workpiece, and the second process controller 155B determines a desired polish time. The two process controllers 155A, 155B may provide conflicting control instructions, for instance, based on the metrology data provided, as described below. Assume that the first process controller 155A determines that an increase in the downforce is needed to achieve the desired process goal, and further assume that the increased downforce results in a non-uniformly polished wafer. If the subsequent wafer measurements reveal that selected portions of the processed wafer were polished too much and others too little, then the second process controller 155B may attempt to compensate for the over-polished areas by reducing the desired polish time, while the first process controller 155A may attempt to increase the downforce to compensate for under-polished regions. Thus, in the above-described example, based on the metrology data, the two process controllers 155A, 155B may issue conflicting control instructions even though both attempt to achieve a common desired goal.

As described below, the process controllers 155 may also provide conflicting control instructions where each of the process controllers 155 controls its own respective processing tool 105. For example, assuming that the first process controller 155A controls a deposition tool, and the second process controller 155B controls an etching tool that removes portions of material deposited by the deposition tool. Further assume that the deposition tool is instructed by the first process controller 155A to deposit more material in the middle of the wafer than the edges because the etching tool has a tendency to etch faster in the middle than at the edge. Under this scenario, if for some reason the deposition thickness in the middle of a particular lot of wafers is higher than desired, the etching tool may not successfully be able to complete its processing. As such, the second process controller 155B may instruct the etching tool 105 to increase the etch time. Accordingly, in this scenario, absent any communication between the two process controllers 155A, 155B, each of them may continue to provide conflicting control instructions (e.g., deposit more material/etch for longer time) to their respective processing tools 105.

As another example, assume that the first process controller 155A is directed to controlling an etch tool and the second process controller 155B is directed to controlling a deposition tool. If the thickness of the layer deposited on the workpieces needs to be reduced, the first process controller 155A may achieve the desired goal by increasing the etch time, while the second process controller 115A may reduce the amount of material deposited by decreasing the deposition time. Thus, in the above-described example, even though the two process controllers 155A, 155B are attempting to achieve a common goal, the two process controllers 155A, 155B may provide competing (or inconsistent) control instructions to their respective tools, with one process controller 155A calling for an increase in etch time and the other process controller 155B calling for a decrease in the deposition time.

The above-presented scenarios are exemplary in nature, and it should be understood that the process controllers 155 may provide conflicting instructions to processing tool(s) 105 or processes in numerous other arrangements.

In accordance with one embodiment of the present invention, the system 100 includes a supervisory controller 160 to facilitate communicating between two or more process controllers 155 to achieve a desired result. In one embodiment, the process controllers 155, 160 of FIG. 1 may be viewed as a multi-tiered controller system, where the process controllers 155A, 155B are the first tier controllers and the supervisory controller 160 is the second tier controller. In other embodiments, additional tiers of controllers 155, 160 may be employed. The supervisory controller 160 may include an interface 161, a control unit 162 and a storage unit 164. The interface 161 may be any suitable type of interface adapted to allow the supervisory controller 160 to communicate with various components of the system 100 of FIG. 1.

The control unit 156 and storage unit 157 of the process controllers 155 and the control unit 162 and the storage unit 164 of the supervisory controller 160 may, in one embodiment, be remotely located or "embedded" into the respective controllers 155, 160.

In the illustrated embodiment, the process controllers 155 and supervisory controller 160 are computer programmed with software to implement the functions described. However, as will be appreciated by those of ordinary skill in the art, a hardware controller designed to implement the particular functions may also be used. Moreover, the functions performed by the process controllers 155 and supervisory controller 160, as described herein, may be performed by multiple controller devices distributed throughout a system. Additionally, the process controllers 155 and the supervisory controller 160 may be stand-alone controllers, may be resident in the processing tool 105, or may be part of a system controlling operations in an integrated circuit manufacturing facility.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

It should be understood that the illustrated components shown in the block diagram of the system 100 in FIG. 1 are illustrative only, and that, in alternative embodiments, additional or fewer components may be utilized without deviating from the spirit or scope of the invention. For example, in one embodiment, the MES 115 may interface with the APC framework 120 through an associated equipment interface. Additionally, it should be noted that although various components, such as the equipment interface 110 of the system 100 of FIG. 1 are shown as stand-alone components, in alternative embodiments, such components may be integrated into the processing tool 105.

Figure 2:
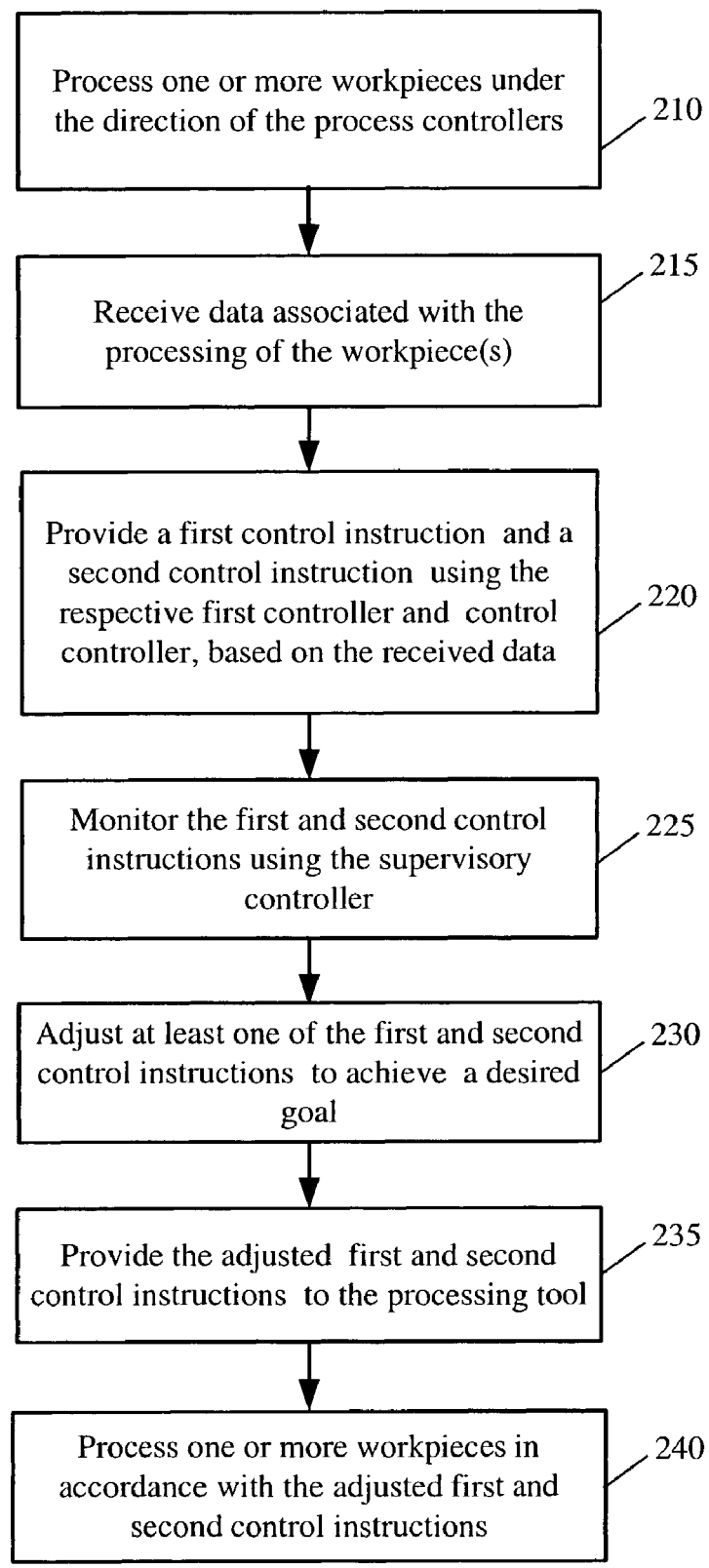
FIG. 2 illustrates a flow diagram of a method that may be implemented in the system of FIG. 1, in accordance with one embodiment of the present invention.

Referring now to FIG. 2, a flow diagram of a method that may be implemented in the manufacturing system 100 of FIG. 1 is illustrated, in accordance with one embodiment of the present invention. The method of FIG. 2 is illustrated in the context of the first and second process controllers 155A, 155B controlling the same processing tool 105, although, with the benefit of this disclosure, the principles described herein can be extended to the process controllers 155A, 155B that control different processing tools 105.

The processing tool 105 processes (at 210) one or more workpieces (e.g., wafers) under the direction of the first process controller 155A and the second process controller 155B.

Each of the process controllers 155 receives (at 215) data associated with the processing of the workpieces. The data may include metrology data and/or trace data. The term "trace data" may be collected in real-time and include a variety of measurements associated with the processing of the workpieces. The type of "trace data" collected may be implementation specific. Exemplary measurements that can be taken in various types of processing tools 105 may include gas flow rates, chamber pressure, chamber temperature, processing time, operating condition of the heating elements, polish time, downforce, polishing pad speed, motor current, polishing arm oscillation magnitude and frequency, slurry chemical composition, and operating conditions of various components of the processing tool 105.

Based on the received data (at 215), the first and second process controllers 155A, 155B provide (at 220) a respective first control instruction and second control instruction to adjust the processing of one or more workpieces. In one embodiment, the first and second control instructions may be directed to reducing variations in the characteristics of the workpieces that are processed. The term "control instruction," as utilized herein, may include one or more instructions that cause the processing tool 105 to perform a desired action (e.g., increase gas flow, activate selected heating elements), or may include data representing one or more settings of the processing tool 105 that need to be adjusted, or may include data representing processing parameters (e.g., etching time) for use by the processing tool 105, or a combination of any of the above.

The type of adjustments made to a particular processing tool 105 or a process operation 102 depends on the particular implementation. For example, assuming that the process controllers 155 control a polishing tool, the first process controller 155A may calculate a desired downforce value (the first control instruction) to polish the workpieces, and the second process controller 155B may calculate a desired polishing time (the second control instruction) to polish the workpieces. As another example, if the processing tool 105 is an etching tool, the first process controller 155A may provide the first control instruction to regulate the gas flow, while the second process controller 155B may provide the second control instruction to regulate the pressure level or the temperature level inside a chamber of the etching tool. As an additional example, if the first processing tool 105 is a deposition tool and the second processing tool 105 is an etching tool, the first controller 155A may provide the first control instruction to control a deposition thickness of a deposition tool, and the second controller 155B may provide the second control instruction to control an etch rate of an etching tool to remove at least a portion of the material deposited by the deposition tool. Similarly, the process controllers 155 may make other types of adjustments to the process, depending on the particular implementation.

The supervisory controller 160 monitors (at 225) the first and second control instructions provided by the process controllers 155. In one embodiment, the supervisory controller 160 may receive the first and second control instructions provided by the process controllers 155 though the interface 161 (see FIG. 1).

The supervisory controller 160 adjusts (at 230) at least one of the first control instruction and the second control instruction to achieve a desired process goal. The supervisory controller 160, in one embodiment, determines whether the two control instructions represent conflicting adjustments (e.g., deposit additional material/longer etch time, increase the air flow/decrease the pressure, increase the downforce/increase the polish time, and the like), and whether it is possible to arbitrate between the conflicting instructions to achieve the desired process goal. The desired process goal (e.g., the desired deposition thickness, etch depth, and the like) depends on the particular implementation.

In one embodiment, the supervisory controller 160 may employ mathematical equations to resolve conflicts among competing process controllers 155. In other embodiments, the supervisory controller 160 may select other suitable methods of resolving conflicts, such as selecting one process controller's instruction(s) over the other(s), compensating a certain percentage in the direction of each process controller 155, and the like. Once the supervisory controller 160 is able to determine a conflict resolution, the supervisory controller 160 adjusts the control instructions (at 235) of one or all of the process controllers 155 accordingly to effectuate the desired process goal. In one embodiment, adjusting the control instructions (at 235) may include issuing new control instructions reflecting the desired changes.

In some instances, because of operational limitations of the individual process controllers 155A, 155B, the supervisory controller 160 may not be able resolve the conflicts to achieve the desired goal. This is because the process controllers 155A, 155B have finite operational limits (or boundaries) within which the process controllers 155A, 155B can control the processing tool(s) 105. Thus, if the supervisory controller 160 determines that the conflict resolution cannot be achieved without exceeding the operational limits of the individual process controller 155A, 155B, the supervisory controller 160 may adjust the control instructions (at 230) to indicate that a processing tool 105 shutdown is required.

The adjusted first and second control instructions are provided (at 235) to the processing tool 105. In one embodiment, the adjusted first and second control instructions are provided to the respective first process controller 155A and the second process controller 155B, which then provide the control instructions to the processing tool 105 (or processing tools 105, if more than one is involved). In an alternative embodiment, the supervisory controller 160 may directly provide (at 235) the adjusted control instructions to the processing tool (or tools) 105.

One or more workpieces are processed (at 240) by the processing tool 105 in accordance with the adjusted first and second control instructions. Because the supervisory controller 160 may resolve (or reduce) conflicts between the two competing process controllers 155A, 155B, the one or more workpieces may be processed (at 240) more efficiently by the processing tool 105. In one embodiment, either one or both of the control instructions may require the processing tool 105 to shutdown if the supervisory controller 160 is unable to resolve the conflict (i.e., if the adjusted control instructions would cause the process controller(s) 155 to exceed its operational range or boundary).

As noted earlier, the principles described in FIG. 2 can be extended to a processing system in which each process controller 155A, 155B controls a different processing tool 105 (or tools).

The various system layers, routines, or modules may be executable by the control unit 156, 162 (see FIG. 1). As utilized herein, the term "control unit" may include a microprocessor, a microcontroller, a digital signal processor, a processor card (including one or more microprocessors or controllers), or other control or computing devices. The storage unit 157, 164 (see FIG. 1) referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
  receiving a first control instruction from a first process controller to process one or more workpieces;
  receiving a second control instruction from a second process controller to process one or more workpieces; and
  adjusting at least one of the first control instruction and the second control instruction to process at least one workpiece to achieve a desired process goal in response to determining that the two control instructions represent at least partially conflicting adjustments.

2. The method of claim 1, further comprising processing the at least one workpiece based on at least one of the adjusted first control instruction and the adjusted second control instruction to achieve the desired process goal.

3. The method of claim 2, wherein processing comprises processing the at least one workpiece in a semiconductor manufacturing process.

4. The method of claim 1, wherein adjusting comprises adjusting at least one parameter of a semiconductor processing tool.

5. The method of claim 1, further comprising providing the adjusted first control instruction and the second control instruction to a semiconductor processing tool to process the at least one workpiece.

6. The method of claim 1, further comprising providing the adjusted first control instruction to a first processing tool and the adjusted second control instruction to a second processing tool.

7. The method of claim 1, wherein the first and second process controllers each operate within a selected boundary, and wherein adjusting comprises adjusting at least one of the first control instruction and the second control instruction to halt the processing of the at least one workpiece based on determining that at least one of the first process controller and the second process controller cannot achieve the desired process goal while operating within the selected boundary.

8. The method of claim 1, wherein the act of receiving the first control instruction comprises a supervisory controller receiving the first control instruction, wherein the act of receiving the second control instruction comprises the supervisory controller receiving the second control instruction, and wherein the act of adjusting comprises the supervisory controller adjusting the at least one of the first control instruction and the second control instruction.

9. An apparatus, comprising:
a interface adapted to receive:
a first control instruction from a first process controller; and
a second control instruction from a second process controller; and
a control unit communicatively coupled to the interface, the control unit adapted to adjust at least one of the first control instruction and the second control instruction to process one or more workpieces to achieve a desired process goal in response to determining that the two control instructions represent at least partially conflicting adjustments.

10. The apparatus of claim 9, wherein the first process controller is adapted to control a first processing tool and the second process controller is adapted to control a second processing tool.

11. The apparatus of claim 9, wherein the first process controller and the second process controller are adapted to control a same processing tool.

12. The apparatus of claim 9, wherein the control unit is further adapted to process the one or more workpieces based on at least one of the adjusted first control instruction and the adjusted second control instruction to achieve the desired process goal.

13. The apparatus of claim 12, wherein the control unit is adapted to process the one or more workpieces in a semiconductor manufacturing process.

14. The apparatus of claim 13, wherein the control unit is adapted to adjust at least one parameter of a semiconductor processing tool.

15. The apparatus of claim 13, wherein the first and second process controllers each operate within a selected boundary, wherein the control unit is adapted to halt processing of the one or more workpieces based on determining that at least one of the first process controller and the second process controller cannot achieve the desired process goal while operating within the selected boundary.

16. An apparatus, comprising:
means for receiving a first control instruction from a first process controller to process a workpiece;
means for receiving a second control instruction from a second process controller to process the workpiece;
means for receiving a desired process goal; and
means for adjusting at least one of the first control instruction and the second control instruction to process one or more workpieces to achieve the desired process goal in response to determining that the two control instructions represent at least partially conflicting adjustments.

17. An article comprising one or more machine-readable storage media containing instructions that when executed enable a processor to:
receive a first control instruction from a first process controller to process one or more workpieces;
receive a second control instruction from a second process controller to process the one or more workpieces;
receive a desired process goal; and
adjust at least one of the first control instruction and the second control instruction to process the one or more workpieces to achieve the desired process goal in response to determining that the two control instructions represent at least partially competing adjustments.

18. The article of claim 17, wherein the instructions when executed enable the processor to process the one or more workpieces based on at least one of the adjusted first control instruction and the adjusted second control instruction to achieve the desired process goal.

19. The article of claim 17, wherein the instructions when executed enable the processor to adjust at least one parameter of a semiconductor processing tool.

20. The article of claim 17, wherein the instructions when executed enable the processor to provide the adjusted first control instruction and the second control instruction to a semiconductor processing tool to process the one or more workpieces.

21. The article of claim 17, wherein the instructions when executed enable the processor to provide the adjusted first control instruction to a first semiconductor processing tool and the adjusted second control instruction to a second semiconductor processing tool.

22. The article of claim 17, wherein the instructions when executed enable the processor to adjust at least one of the first control instruction and the second control instruction to halt the processing of the one or more workpieces based on determining that at least one of the first process controller and the second process controller cannot achieve the desired process goal while operating within a selected boundary.

23. A system, comprising:
a first process controller adapted to provide a first control instruction to process one or more workpieces;
a second process controller adapted to provide a second control instruction to process one or more workpieces; and
a supervisory controller adapted to adjust at least one of the first control instruction and the second control instruction to process at least workpiece to achieve a desired process goal in response to determining that the two control instructions represent at least partially conflicting adjustments.

24. The system of claim 23, wherein the first process controller controls a first processing tool and the second process controller controls a second processing tool.

* * * * *